(12) United States Patent
Tsutsui (10) Patent No.: US 7,333,772 B2
(45) Date of Patent: Feb. 19, 2008

(54) ELECTRONIC APPARATUS AND A COMMUNICATION CONTROL METHOD

(75) Inventor: Masanao Tsutsui, Chiba (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 10/917,375

(22) Filed: Aug. 13, 2004

(65) Prior Publication Data

US 2005/0079819 A1    Apr. 14, 2005

(30) Foreign Application Priority Data

Aug. 22, 2003   (JP) .............................. 2003-298741

(51) Int. Cl.
  *H04Q 7/20*  (2006.01)
(52) U.S. Cl. .................... 455/41.2; 455/517; 455/41.3; 709/223
(58) Field of Classification Search ................ 455/41, 455/41.1–41.3, 127, 517; 340/10.1; 709/223; 358/1.15
  See application file for complete search history.

(56) References Cited

U.S. PATENT DOCUMENTS

| | | | |
|---|---|---|---|
| 6,101,375 A * | 8/2000 | Tuttle et al. ............. | 455/127.2 |
| 6,177,858 B1 * | 1/2001 | Raimbault et al. ......... | 340/10.1 |
| 6,785,016 B1 * | 8/2004 | Silverbrook et al. ....... | 358/1.15 |
| 6,987,578 B2 * | 1/2006 | Alexander ................ | 358/1.15 |
| 2001/0007815 A1 * | 7/2001 | Philipsson .................... | 455/41 |
| 2002/0059406 A1 * | 5/2002 | Tanaka et al. .............. | 709/223 |
| 2004/0005863 A1 * | 1/2004 | Carrender ................ | 455/41.1 |
| 2004/0090310 A1 * | 5/2004 | Hohberger et al. ........ | 340/10.1 |
| 2004/0160623 A1 * | 8/2004 | Strittmatter et al. ....... | 358/1.15 |
| 2005/0176373 A1 * | 8/2005 | Gilbert et al. ............. | 455/41.2 |

\* cited by examiner

*Primary Examiner*—Jean Gelin
*Assistant Examiner*—Michael Vu
(74) *Attorney, Agent, or Firm*—Oblon, Spivak, McClelland, Maier & Neustadt, P.C.

(57) ABSTRACT

In order to have an electronic apparatus in which user's feeling of operation upon making a connection to a desired slave apparatus through wireless communication is improved, the present invention provides an electronic apparatus in which a control microcomputer lowers a transmission power of a Bluetooth module than a normal condition and determines the number of apparatuses to be searched to transmit an interrogation signal on a wireless communication line. Information of a service class of an apparatus responded to the interrogation signal is obtained from received information and a connection link is established to the apparatus if the apparatus is capable of handling an application to use. If the apparatus is not capable of handling the application or if no apparatus responded, the transmission power is set higher to increase the number of the apparatuses to be searched and to retransmit the interrogation signal.

17 Claims, 6 Drawing Sheets

ELECTRONIC APPARATUS AND A COMMUNICATION CONTROL METHOD

CROSS REFERENCES TO RELATED APPLICATIONS

The present document is based on Japanese Priority Document JP 2003-298741, filed in the Japanese Patent Office on Aug. 22, 2003, the entire contents of which being incorporated herein by reference.

BACKGROUND OF THE INVENTION

1. Field of the Invention

The present invention relates to an electronic apparatus for searching a connection target apparatus through a wireless communication line, providing wireless connection to a discovered apparatus to transmit and receive data and a communication control method in such an electronic apparatus and particularly to an electronic apparatus and a communication control method, suitable for communication using a near field wireless communication line such as the Bluetooth.

2. Description of Related Art

Recently, the Bluetooth draws attention as a near field wireless data communication standard. In the Bluetooth, wireless modules compliant therewith have been small-sized and low-priced and the power consumption is low, being easily mounted in portable apparatuses such as a digital still camera and a mobile phone. This makes it possible to wirelessly transmit and receive simply data such as images or voices among these apparatus or information apparatus such as PCs (Personal Computer). For example, there has been proposed to transfer the data of an image captured by a digital still camera directly to a printer without intervention by a PC or a recording medium to print out the image.

If a file transmission or the like is executed after connection between an apparatus and another apparatus using the Bluetooth, a connection source apparatus (Master) must specify a target apparatus (Slave) to be connected. Particularly, it is a general procedure that, upon an initial connection, Bluetooth apparatuses existing therearound are searched, and a target slave apparatus is selected to be connected.

According to such search of a connection target apparatus, because it is not always that the target slave apparatus is found at the first time, in the conventional general method, the number of apparatus to be searched is approximately set five to ten. However, if a plurality of apparatuses are found under such a condition, it is necessary to select the target slave apparatus from them, for example, by the input by the user. This may damage the user's feeling.

On the other hand, a technique has been proposed in which lowering the wireless power from the wireless module during searching than the general condition makes a searchable physical area narrower causes the user to bring the master apparatus close to the slave apparatus, so that the slave apparatus is searched for connection. This technique increases the possibility of connection to the target slave apparatus at an early stage, providing a communication operation intuitive for the user.

Further, if a plurality of slave apparatuses are searched, for example, there is a proposed method, in which, these apparatuses are filtered on the basis of whether or not an application to use can be handled by the slave apparatus, a type of the salve apparatus or the like and a connection is automatically made to a slave apparatus considered to be available or only the slave apparatuses considered to be available are listed and displayed to make the user select one.

Further, when a device address of the searched slave apparatus is registered and in a case of transiting to a connection operation using this device address, the operation load on the user and the cost of the apparatus have been decreased conventionally. As such a wireless transmission apparatus, there is one in which a registration switch is provided. In the wireless transmission apparatus, when it is depressed, an operation searching an apparatus on the slave side is started. If the apparatus is found, a device address on the slave side is obtained, and then, it is judged whether the registration switch is depressed. In a case where it is depressed, it is judged that the registration is accepted, the device address obtained from the apparatus on the slave side is stored in a memory, and the registration operation is terminated. (For example, refer to Patent Document 1).

[Patent Document 1]

Japanese Patent Application Publication No. 2003-037603 (paragraph [0027] to [0031], FIG. 2).

Here, to surely connect to a target slave apparatus within a short time period, if there is no different Bluetooth apparatus around the target slave apparatus, the number of the apparatuses to be searched is set to one. However, in fact, a plurality of Bluetooth apparatus may possibly exist adjacently, as in a case, for example, a wireless communication mouse for a PC exists adjacent to a printer. As mentioned above, this is applicable to a case where the wireless transmission power from the wireless is made lower than that at the wireless communication from the wireless module during the searching. Thus, for example, there may be a case where a connection is made to a different slave apparatus searched and the same slave apparatus is searched again though a further search is carried out. Thus, it takes a long time to obtain a correct connection, which may make the user's feeling of operation bad.

Further, in a case where the number of the apparatuses in search is more than one, a plurality of slave apparatuses are searched so that a connection may be made to a different slave apparatus erroneously by the user's selection operation, or only slave apparatuses other than the target one are searched so that the user tries to select one from them, resulting in wasting a lot of time.

Further, if the searched slave apparatus is filtered on the basis of the capability of executing applications or the type of the apparatus, there may be a plurality of slave apparatuses may remain as selection targets after the filtration. Thus, there is no difference in occurrence of a difficult condition for the user in selection. As mentioned above, it is not easy to improve the operation feeling by providing a sure connection to the target slave apparatus as quickly as possible.

The present invention has been developed in consideration of such a problem, and an object of the present invention is to provide an electronic apparatus of which operation feeling to the user upon the connection with a desired slave apparatus by wireless communication is improved.

Further, another object of the present invention is to provide a communication method capable of improving operation feeling of the user upon the connection to the desired slave apparatus by wireless communication.

SUMMARY OF THE INVENTION

In order to resolve the above-mentioned problem, in an electronic apparatus searching a connection target apparatus through a wireless communication line and providing wirelessly connection to a searched apparatus to transmit and receive a signal, there is provided an electronic apparatus characterized by comprising wireless communication means for transmitting and receiving a signal through the wireless communication line, communication control means for controlling a communication procedure by the wireless communication means, and attribution information storing means for previously storing attribution information of the connection target apparatus and characterized in that the communication control means determines the number of the apparatuses to be searched and then transmits an interrogation signal, obtains the attribution information regarding the apparatus responded to the interrogation signal from received information from the apparatus responded, compares it with the attribution information stored in the attribution information storing means, and in a case of agreement, a connection link is established to the apparatus responded, and in a case of disagreement and in a case where no apparatus responded, the number of the apparatus to be searched is increased to retransmit the interrogation signal.

Here, the wireless communication means transmits and receives a signal through the wireless communication line in which the communication procedure is controlled by the communication control means. Further, in the attribution information storing means, the attribution information of the connection target apparatus is previously stored before the connection of the apparatus is established. The communication control means determines the number of apparatuses to be searched and operates the wireless communication means to transmit the interrogation signal indicative of the determined number of the apparatuses to be searched. Further, the attribution information about the apparatus that responded to the interrogation signal is obtained from the reception information from the apparatus responded to it and is compared with the attribution information stored in the attribution information storing means to judge whether possibility that the obtained attribution information is from the desired apparatus is high or not. In a case where the compared information agrees with each other, the wireless communication means is made to establish the connection link to the apparatus that responded. In a case where the compared information disagrees with each other, and a case where no apparatus responded to the interrogation signal, the number of the apparatuses to be searched is increased to make the condition better for searching the desired apparatus to retransmit the interrogation signal.

Further, in the above-mentioned electronic apparatus, it is desired to further provide transmission power control means for lowering the transmission power at the first transmission of the interrogation signal than that after the establishment of the connection link.

Further, in the above-described apparatus, it is desired that identification information storing means for storing identification information identifying the apparatus that responded to the interrogation signal is further provided, and that in a case where the attribution information regarding the apparatus responded to the first interrogation signal disagrees with the attribution information stored in the attribution information storing means, the identification information of the apparatus is stored in the identification information storing means to execute the retransmission of the interrogation signal so that only in a case where the identification information regarding an apparatus responded after the retransmission disagrees with the information stored in the identification information stored in the identification information storing means, the attribution information regarding the apparatus is compared with the information stored in the attribution information storing means, and in a case where the former information agrees with the latter in the attribution information storing means, the communication control means is made to establish the connection link to the apparatus.

Further, the present invention provides, in a communication control method for searching a connection target apparatus through a wireless communication line for executing transmission and reception of a signal by wireless connection to the searched apparatus, the method being characterized in that attribution information of the apparatus to be searched is previously stored and the number of apparatus to be searched is determined, an interrogation signal is transmitted on the wireless communication line, the attribution information of the apparatus that responded to the interrogation signal is obtained from the reception information from the apparatus responded, the attribution information is compared with the attribution information previously stored, in a case of agreement, a connection link is established to the apparatus responded, and in a case of disagreement and a case of no apparatus responded, the number of the apparatuses to be searched is increased and then, the interrogation signal is retransmitted.

In this communication control method, the number of the apparatuses to be searched is determined, and then, the interrogation signal is transmitted on the wireless communication line. The attribution information of the apparatus responded to the interrogation is obtained from the information received from the apparatus that responded and is compared with the previously stored attribution information to judge whether the possibility that the apparatus is the desired one is high. If the compared information agrees with each other, the connection link to the apparatus responded is established. If the compared information disagrees with each other or no apparatus responded to the interrogation signal, the number of the apparatuses to be searched is increased and the interrogation signal is retransmitted to provide the condition in which the desired apparatus can be searched more easily.

Further, it is desirable to make a transmission power lower at a first transmission of the interrogation signal lower than that after the establishment of the connection link.

Further, it is desirable that if the attribution information regarding the apparatus that responded to the first interrogation signal disagrees with the attribution information previously stored, the identification information of the apparatus is stored in the memory, and the interrogation signal is retransmitted. Only in a case where the identification information regarding an apparatus responded after the retransmission disagrees with the identification information stored in the memory, the attribution information regarding the apparatus responded is compared with the attribution information previously stored, and in a case where the former information agrees with the latter information previously stored, a connection link is established to the apparatus responded.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION OF PREFERRED EMBODIMENTS

Hereinbelow will be described an embodiment of the present invention with reference to the accompanied drawings.

Figure 1:
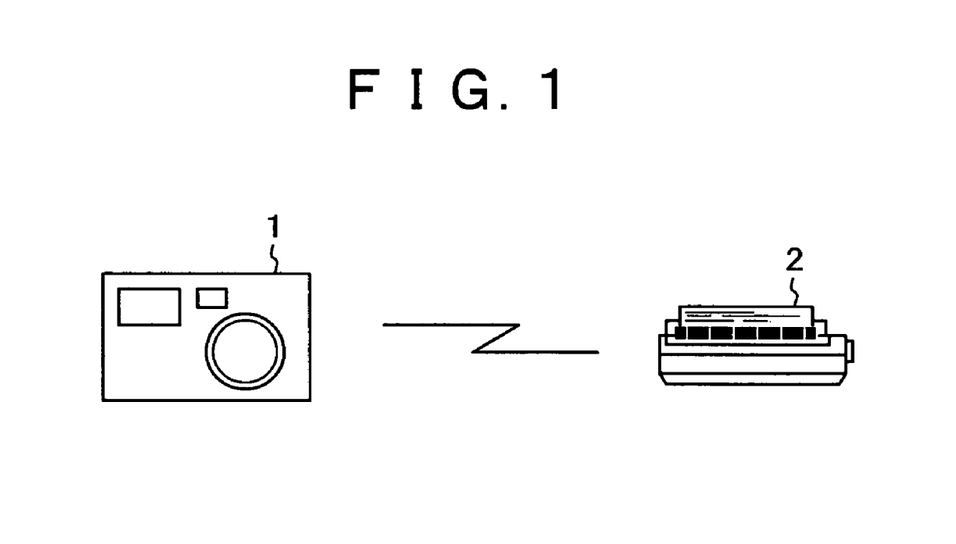
FIG. 1 is a drawing illustrating an example of a system structure of a wireless communication system according to an embodiment of the present invention.

FIG. 1 is a drawing illustrating an example of a system structure of a wireless communication system according to an embodiment of the present invention.

The present invention is applicable to the apparatus executing wireless communication at a relatively near distance. This embodiment assumes a wireless communication system using the Bluetooth as a wireless communication standard for the communication. The wireless communication system includes, as shown in FIG. 1, a digital still camera (hereinafter referred to as DSC) 1 and a printer 2. The DSC 1 records a captured still image on a recording medium as a digital system image data and wirelessly transmits the recorded image data according to the Bluetooth method. The printer 2 prints on a predetermined sheet of paper on the basis of the image data wirelessly received.

Further, the present embodiment assumes a case that the image data captured and recorded on the recording medium in the DSC 1 is transmitted to the printer 2. However, it is assumed that in an actual wireless communication system, not shown, other apparatuses capable of wireless communication according to the Bluetooth method around these apparatuses may exist. In this embodiment, as such an apparatus, for example, a wireless communication mouse, a PC, a mobile phone, a PDA (Personal Digital Assistant) or the like are given. In the present invention, in such a condition, it is possible that if communication is executed with wireless connection from the DSC 1 operating as a master apparatus to the printer 2 as a slave apparatus, an erroneous connection with a different apparatus is prevented, so that an operation ability of the DSC 1 for the user can be improved.

Figure 2:
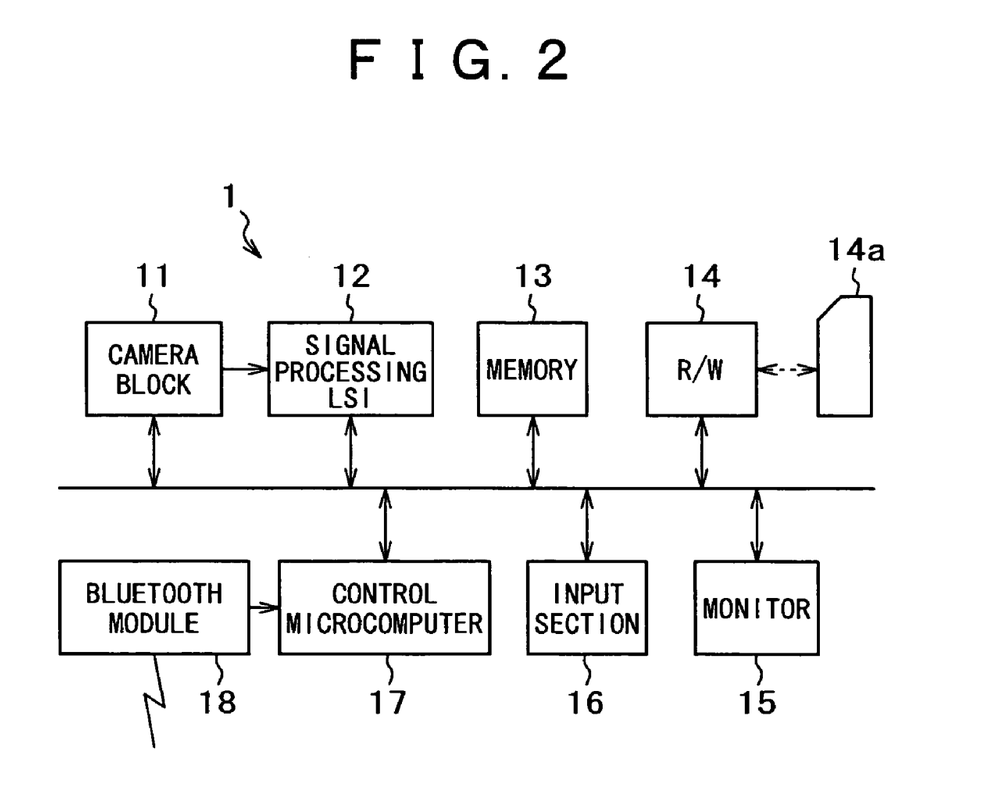
FIG. 2 is a block diagram illustrating an example of an internal structure of the DSC.

FIG. 2 is a block diagram illustrating an example of an internal structure of the DSC 1.

As shown in FIG. 2, the DSC 1 comprises a camera block 11 having an image-capturing function, a signal processing LSI for effecting analog-digital conversion, data format conversion processing or the like for the captured image signal, a memory 13 comprising a VRAM (Video Random Access Memory) or the like for temporarily storing the image data or the like, a Reader/Writer (R/W) 14 for writing on and reading from a memory card 14a as a detachable semiconductor memory, a monitor 15 for displaying an image, an input section 16 for inputting user's operation, and a control microcomputer 17 for controlling the whole of the apparatus, which are connected through a bus. Further, to the control microcomputer 17, a Bluetooth module 18 for wireless communication with an external apparatus is connected.

The camera block 11 comprises an optical system including a lens to which light from an object is incident, an iris, a shutter, and an imaging element or the like for photoconverting the incident light such as a CCD (Charge Coupled Device).

The signal processing LSI 12 effects a conversion process from the output signal of the imaging element to a digital signal, a noise removing process, an image quality correction process, a conversion process to a luminance signal and a color difference signal, and a coding processing for a predetermined data format such as the JPEG (Joint Photographic Coding Experts Group) standard or the like. Further, it executes a decoding process, data formatting, and conversion processes of resolution or the like on the image data read out from the memory card 14a.

The memory 13 holds various application programs for capturing an image, recording and replaying operations of the image, and wireless communication and necessary data, and temporarily stores the data such as images during execution of these processes.

The R/W 14 writes on the memory card 14a the image data converted into a predetermined data format in the signal processing LSI 12 and read out the image data stored in the memory card 14a to send it to the control microcomputer 17 or the signal processing LSI 12.

The monitor 15 comprises, for example, an LCD (Liquid Crystal Display) or the like, capable of displaying the image captured by the camera block 11, i.e., the so-called a camera-through image, and further displays the image read out from the memory card 14a.

The input section 16 comprises, for example, a shutter release button for operating the shutter of the camera block 11, a selection switch for selecting an operation mode or the like to supply an instruction input signal corresponding to the operation by the user to the control microcomputer 17.

The control microcomputer 17 is a control processing section for controlling respective circuit blocks of the DSC 1, while executing the application programs stored in the memory 13 at needs, controls respective circuit blocks on the basis of the instruction input signal from the input section 16.

The Bluetooth module 18 comprises, for example, an antenna and an RF (Radio Frequency) transceiver for the signal transmission and reception according to the frequency hopping type of the spectrum diffusion method, a processor or the like for effecting a baseband processing, an interface processing with the control microcomputer 17 to execute wireless communication with external apparatuses such as the printer 2 in accordance with the communication procedure controlled by the control microcomputer 17.

In such a DSC 1, the image signal captured by the camera block 11 is displayed on the monitor 15 through the signal processing LSI 12 under the control of the control microcomputer 17. Further, when the shutter of the camera block 11 is popped in response to the instruction input signal from the input section 16, the captured image signal is converted into a digital data in a predetermined data format in the signal processing LSI 12, and is sent to the R/W 14 and recorded on the memory card 14a. Further, the image data recorded on the memory card 14a is read out and decoded by the signal processing LSI 12, and the reproduced image can be displayed on the monitor 15. Further, the read out image data can be wirelessly transmitted through the Bluetooth module 18 to external apparatuses including the printer 2.

Figure 3:
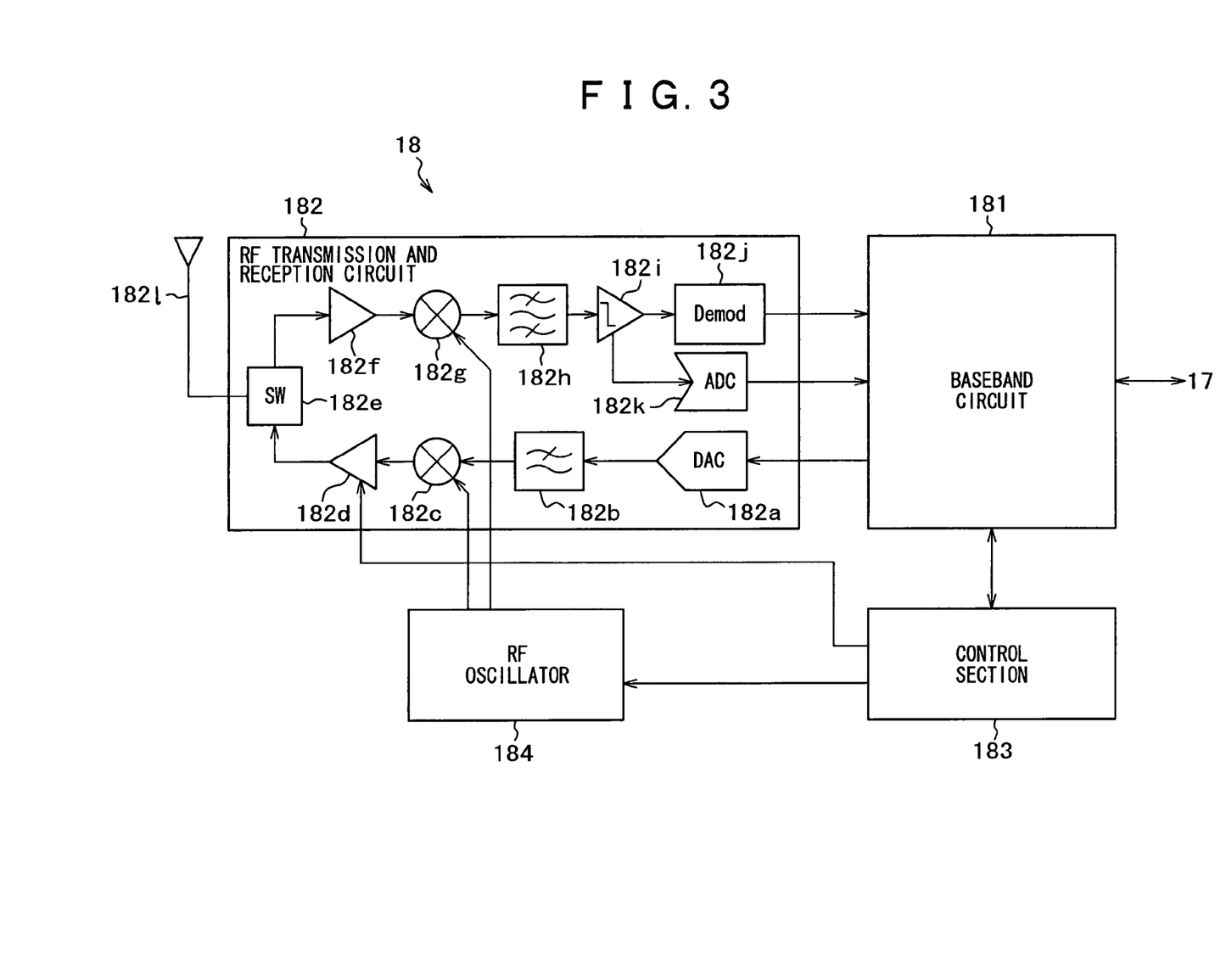
FIG. 3 is a drawing illustrating an example of an internal structure of a Bluetooth module.

Here, FIG. 3 is a drawing illustrating an example of an internal structure of the Bluetooth module 18.

As shown in FIG. 3, the Bluetooth module 18 comprises a baseband circuit 181, an RF transmission and reception circuit 182, a control section 183, and an RF oscillator 184.

The baseband circuit 181 comprises, for example, a memory for temporarily storing the data received from the control microcomputer 17 and the RF transmission and reception circuit 182, and a signal processing circuit or the like for physical (RF) layer control and thus provides a communication link for the data from the control microcomputer 17 and executes a packet retransmission process, an error correction process, and the like.

The RF transmission and reception circuit 182 comprises a transmission circuit and a reception circuit for wireless communication. More specifically, for example, a Digital-Analog-Converter (DAC) 182a, a low pass filter 182b, an IQ modulator 182c, a transmission amplifier 182d, an RF switch circuit 182e, a reception amplifier 182f, an IQ demodulator 182g, a bandpass filter 182h, a discriminator 182i, an FM demodulator 182j, an Analog-Digital-Converter (ADC) 182k, and an antenna 182l.

The signal supplied from the baseband circuit 181 is converted into an analog signal by the DAC 182a and its high frequency components are removed by the low pass filter 182b, and then demodulated by the IQ modulator 182c. The IQ demodulator 182c executes the spectrum diffusion of the frequency hopping method on the basis of a reference wave from the RF oscillator 184. The modulated signal is amplified by the transmission amplifier 182d and is supplied to the antenna 1821 through the RF switch circuit 182e to be wirelessly transmitted. Further, a gain of the transmission amplifier 182d is controlled by a control signal from the control section 183.

On the other hand, the signal received by the antenna 1821 is supplied to the reception amplifier 182f through the RF switch circuit 182e and amplified there, and then, demodulated on the basis of the reference wave from the RF oscillator 184 by the IQ demodulator 182g. Further, its bandwidth is limited by the band pass filter 182h, and then the signal is down-converted into an intermediate frequency by the FM demodulator 182j or the ADC 182k through the discriminator 182i to be supplied to the baseband circuit 181.

The control section 183 controls respective blocks in the Bluetooth module 18 in accordance with the information inputted from the control microcomputer 17 through the baseband circuit 181. Here, the control section 183 is capable of lowering the transmission power by decreasing the gain of the transmission amplifier 182d than the transmission power after the establishment of the communication link during the transmission of the interrogation signal to the slave apparatuses in response to the control signal from the control microcomputer 17. Further, it is also possible to control the transmission power stepwise.

The RF oscillator 184 comprises an oscillator and a PLL (Phase Locked Loop) or the like to supply the reference wave for the frequency hopping to the IQ modulator 182c and the IQ demodulator 182g.

Figure 4:
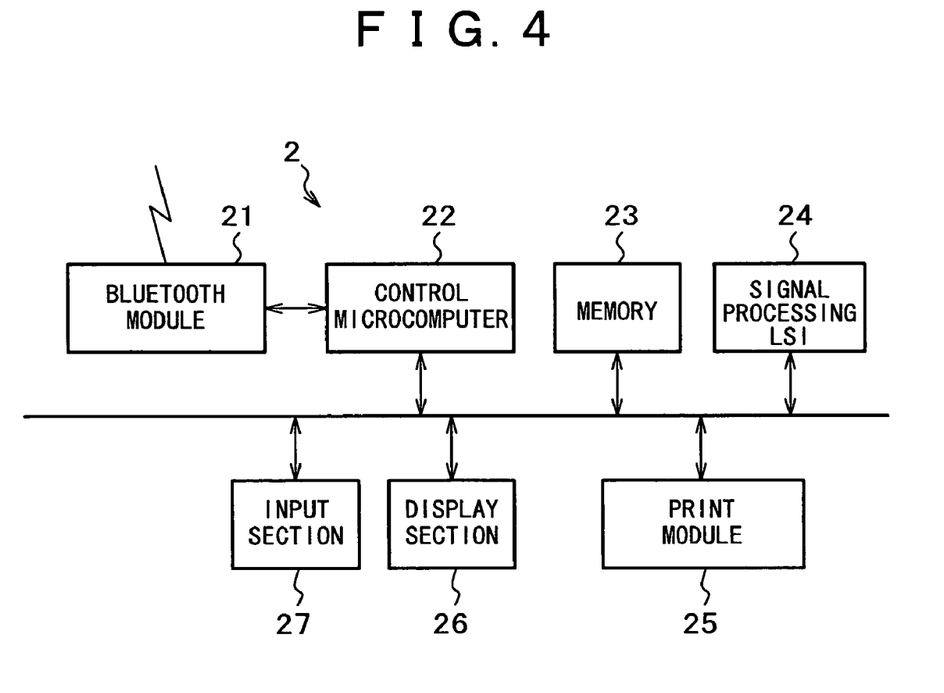
FIG. 4 is a block diagram illustrating an example of an internal structure of a printer.

Next, FIG. 4 is a block diagram illustrating an example of an internal structure of the printer 2.

As shown in FIG. 4, the printer 2 comprises a Bluetooth module 21 having the same function as the Bluetooth module 18 included in the DSC 1, a control microcomputer 22 for controlling the whole apparatus, a memory 23 for temporarily storing the data, a signal processing LSI 24 for executing a demodulation process or the like of the received image data, a print module 25 for printing an image on a sheet of printing paper, a displaying section 26 for displaying the operation conditions or the like, and an input section 27 for a manual operation by the user, which are connected through a bus.

The Bluetooth module 21 executes wireless communication among external apparatus including the DSC 1 under the control microcomputer 22. The control microcomputer 22 is a control processing section for controlling respective circuit blocks of the printer 2, and controls respective circuit blocks on the basis of the instruction input signal from the input section 16 or the data received through the Bluetooth module 21 while executing an application program in the memory 23 at needs.

The memory 23 comprises a ROM, a RAM or the like for holding an application program or data for the printing operation and the wireless communication or the like. Further, it temporarily holds data during the reception and the printing operation of the image data. The signal processing LSI 24 executes the decoding process and the conversion process of resolution or the like for the image data.

The print module 25 comprises a paper inserting section, a paper feeding mechanism, a printing mechanism or the like, and prints an image on a set sheet of paper on the basis of the input image data. The display section 26 comprises, for example, LEDs (Light Emitting Diodes) or the like to display the operation conditions including the printing operation and the data reception operation, and the operation modes and the like, of the printer 2. The input section 27 comprises button switches operated by a user to execute paper feeding, settings of the operation mode and the like.

In such a printer 2, wireless communication is executed with external apparatus such as the DSC 1 through the Bluetooth module 21 under the control of the control microcomputer 22 to receive image data. The received image data is subjected to a decoding process or the like at the signal processing LSI 24 and then sent to the print module 25 where a printing operation is carried out.

Here, in the Bluetooth, to obtain connection to a target slave apparatus by a master apparatus, it is necessary that the master apparatus broadcasts an interrogation message on the wireless communication line and searches the apparatus responding to this. However, if there are a plurality of Bluetooth apparatuses around the master apparatus, the master apparatus receives responses from these apparatuses, so that it is necessary to select the target apparatus.

Here, a signal transmission area of the Bluetooth signal is about 10 m. Lowering the power during transmitting the interrogation message make a reachable area of the message narrower, so that only the slave apparatuses adjacent to the master apparatus respond. This enables to easily search the target apparatus. For example, if either of the master apparatus or the slave apparatus as the connection target is a portable type, upon the connection, this portable type apparatus can be exposed to the partner apparatus after approaching the partner apparatus. Thus, a flair-like connection operation is provided to the user and the connection to the target apparatus is more surely provided.

However, with increase in the number of Bluetooth apparatuses, though the response message is transmitted with the lowered transmission power, it is not always that only the target slave apparatus exists within the signal reachable area, so that there is a possibility that responses are received from a plurality of slave apparatuses even in the method mentioned above.

On the other hand, setting the number of apparatus searched by the master apparatus as few as possible limits the responding apparatus. However, if there is a plurality of slave apparatus within the signal reachable area, there is the possibility that apparatuses that responded at an earlier stage do not include the target apparatus. This cannot prevent an error connection.

Thus, it is desirable to execute filtering on the basis of the information of the responding apparatus and automatically judges whether the apparatus that responded is the target one or which apparatus is the target out of a plurality of apparatuses that responded. The use of such filtering decreases the possibility of the necessity of the user's selection operation from the apparatuses that responded.

In the case of the Bluetooth, in the above-described interrogation procedure, the interrogation hopping system is defined as two divided carriers, wherein an interrogation for each carrier is executed at a period of 10 milliseconds at least 256 times. Accordingly, the interrogating condition of each carrier continues for 2.56 seconds, so that it takes about 10 seconds or more to establish the connection link. Thus, the judgment made as to whether the connection is erroneous by filtering after the establishment of the connection link may largely spoil the user's operation feeling.

On the other hand, the response to the interrogation message informs the master apparatus about the device address of the slave apparatus. At this point, the master apparatus requests the slave apparatus that responded so as to obtain information about a service type (service class), a device type (device class), and an apparatus name (device name) corresponding to the slave apparatus. Therefore, in the present invention, the execution of filtering on the basis of these pieces of information obtained before the establishment of the connection link provides the connection in a short time interval without the user's selection operation, and decrease the possibility of an error connection, substantially increasing the user's operation ability during the connection.

Next, three controlling examples are given about the communication procedure upon wireless connection by the control microcomputer 17 of the DSC 1 with an assumption of a case where the image data recorded on the memory card 14*a* of the DSC 1 is wirelessly transferred to the printer 2.

A FIRST CONTROL EXAMPLE

A case where the number of the apparatus to be searched is set one at an initial condition will be described as a first control example. In this control example, the first searched one apparatus is filtered. If it is an available apparatus, the process proceeds to a connection operation. If it is not an available apparatus, the number of the apparatuses to be searched is increased and the searching is carried out again. Further, out of the apparatuses that responded to the research, the apparatuses that responded at the first search is excluded and the remaining apparatuses are filtered, which results in lowering possibility of occurrences of error connections.

Figure 5:
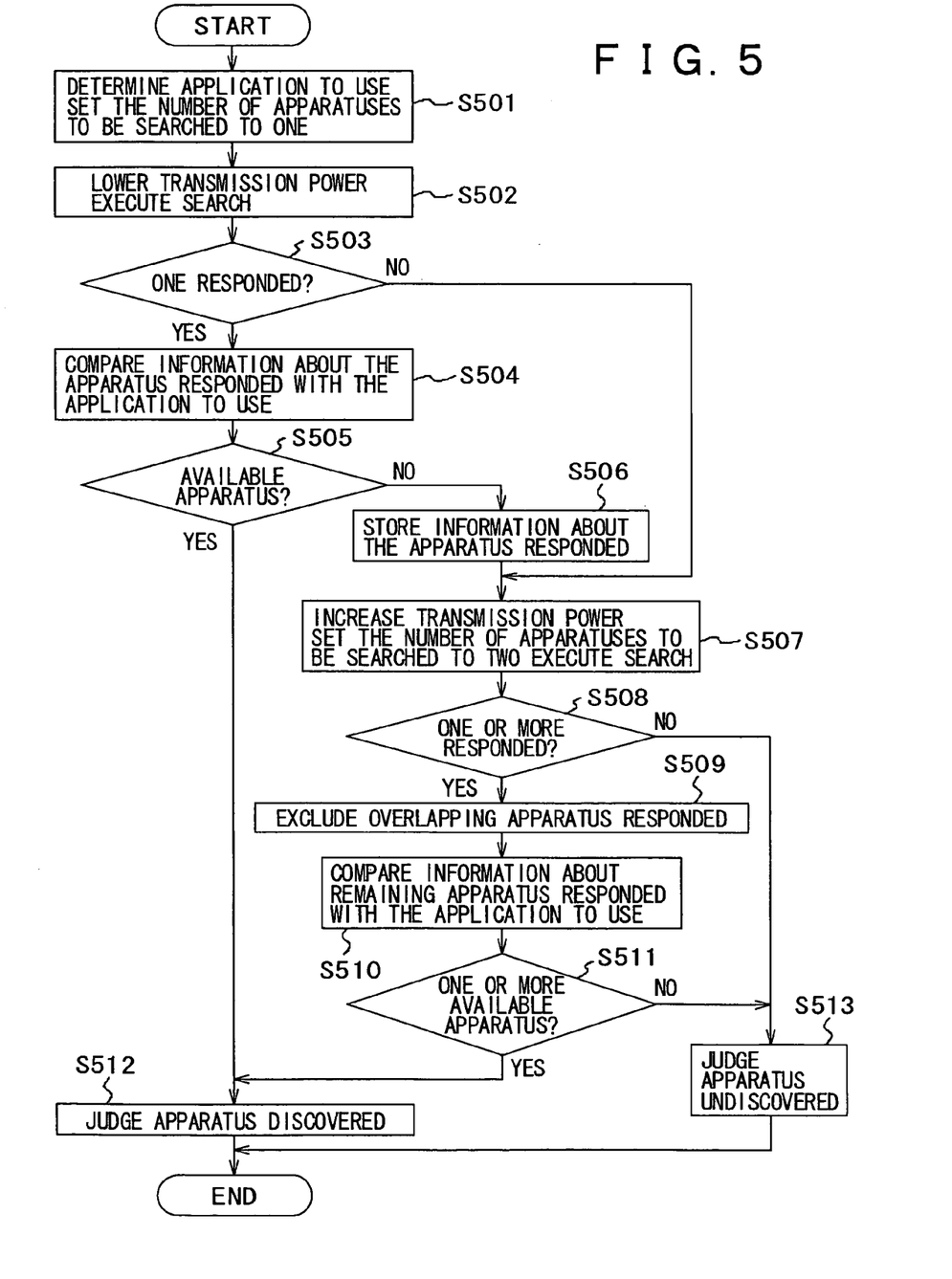
FIG. 5 is a flow chart describing a first control example during wireless connection.

FIG. 5 is a flow chart illustrating the first example of control during the wireless connection.

In step S501, an application program for image transferring is activated in response to the operation by the user. During this, the information of the application to use is determined as the initial setting. Here, it is assumed that filtering is executed on the basis of a service class of the apparatus that responded to an interrogation, and thus all the service class capable of transferring the image is set to the memory 13. Further the number of the apparatus to be searched is set to one.

In step S502, a control command for lowering the transmission power is issued so as to lower a gain of the transmission amplifier 182*d* than that of a normal condition in the Bluetooth module 18. Then, the Bluetooth module 18 is made to transmit the interrogation message to execute the search of the apparatus.

In step S503, a response message in response to the interrogation is obtained from the Bluetooth module 18. In a case where the number of apparatus that responded is one, the process proceeds to step S504, and in a case where there is no apparatus responded, the process proceeds to step S507.

In step S504, information of the application which the apparatus responded can handle is obtained and is compared with the information of the application to use, which was determined in step S501. More specifically, the service classes are compared.

In step S505, from the comparison result, if the apparatus responded is an apparatus capable of handling the target application (here, the apparatus having the service class capable of transferring the image), the process proceeds to step S512. If no, the process proceeds to step S506.

In step S506, identification information regarding the apparatus responded is temporarily stored in the memory 13. Here, for example, a device address obtained during the responding is stored.

In step S507, the gain of the transmission amplifier 182*d* of the Bluetooth module 18 is increased to increase the transmission power than that at the first search. Further, the number of the apparatus to be searched is set to two, and the transmission of the interrogation message is carried out to continue the search.

In step S508, if the number of the apparatuses responded is one or more, the process proceeds to the step S509. If no apparatus responded, the process proceeds to step S513.

In step S509, out of the apparatuses responded, the apparatuses having the same device addresses as those stored in step S506 are excluded. Here, the use of the device address inherent to the Bluetooth modules in apparatuses as a comparison target surely excludes the apparatuses, which responded at the first searching, judged not to be available to avoid connection to these excluded apparatuses.

In step S510, the information (here, the service class) of the apparatus remained as a result of the comparison in step S509 is compared with the information of the preliminarily determined application to use.

In step S511, if there is one or more apparatuses capable of transferring the image, the process proceeds to step S512. If no, the process proceeds to step S513.

In step S512, it is judged that the apparatus capable of transferring the image is discovered. Here, if it is judged to be an available apparatus (that is, an apparatus capable of handling the application and transferring the image) in step S505, and if the available apparatus is only one, for example, a device name of this apparatus is displayed on the monitor 15. When the user performs the input operation after confirming it as the target apparatus, a connection link to the apparatus is established. In addition, the connection link may be automatically established without the user's operation. The establishment of the connection link effects the image transferring. On the other hand, if there are two available apparatuses in step S511, for example, the device names or the like of these apparatuses are displayed on the monitor 15, and then the connection link is established to the apparatus selected by the user's operation.

In step S513, it is judged that no available apparatus can be found, and, for example, the user is notified of this through an indication on the monitor 15.

Further, the slave apparatus side (for example, the printer 2) waits for an interrogation message from another Bluetooth apparatus in an interrogation scanning condition, and when receiving a message, the slave apparatus side transmits a response message to the master apparatus, and then transits into a slave response condition. The slave response condition permits the transmission of information including the device address, the service class, the device class, the device name, or the like to the master apparatus in response to the request from the master apparatus. When a synchronizing confirmation packet is transmitted from the master apparatus, the condition transits into a connection condition. If this packet cannot be received within a predetermined interval, the condition returns to the interrogation scanning condition.

In the above-described process by the flow chart, when the response is received from the slave apparatus (here, the printer 2) that can handle the application to use by the first search in step S502, the connection link can be established within a short time period.

Further, in a case where a slave apparatus (for example, a wireless communication mouse), that is not a target apparatus, responded to the first search, the filtering by comparison in the application to use avoids an erroneous connection, and thus, the second search in step S507 is, for example, automatically carried out again. Here, if only the same apparatus is found at the second search also, it is judged that the available apparatus cannot be found, and thus an error connection can be avoided and as well as this prevents a condition that the user is required to disconnect the erroneous connection.

Further, at the second search, the search area is enlarged to increase the number of the search target apparatuses to increase the possibility of the discovery of the target slave apparatus. This may cause the possibility that two apparatuses respond. However, the apparatus of which discovery is overlapped with that of the first search is excluded in the process of the step S509, and thus, other apparatuses are subjected to filtering. Then, if the filtered one is judged to be the available apparatus, the user is informed of this. That is, when two apparatuses respond, the user is informed only about one apparatus having a high possibility of being the target one, so that the user can continue the connection operation without disturbance.

Further, if the apparatus cannot be discovered at the first search, and two are discovered at the second search, the comparison in the application to use can select the apparatus having a high possibility of being the target one. Further, setting the number of the search apparatuses to two in the second search avoids the condition that a lot of apparatuses are discovered, and that the user hesitates in the selection.

As described above, though the number of the apparatus to be searched is set one at the first search, at the end of the above-described process the possibility of discovery of the target apparatus increases, so that the establishment of the connection link can be provided in a short time interval. In addition, if no target apparatus can be discovered, the user is informed about this before the establishment of the connection link, so that the user can carry out, for example, the operation for re-search rapidly with that the position of the master apparatus or the slave apparatus is changed, wherein the stress in operation is reduced.

A SECOND CONTROL EXAMPLE

Next, will be described a case where the number of apparatuses to be searched in the initial condition is set to two. The second control example utilizes a fact that, if only one apparatus responded though the number of apparatuses to be searched is set to two, the apparatus is highly possibly the target apparatus. That is, if there is only one response to the search, it is judged that the apparatus responded is an available apparatus without reservation. If two apparatuses responded, the available apparatus is judged after filtering.

Figure 6:
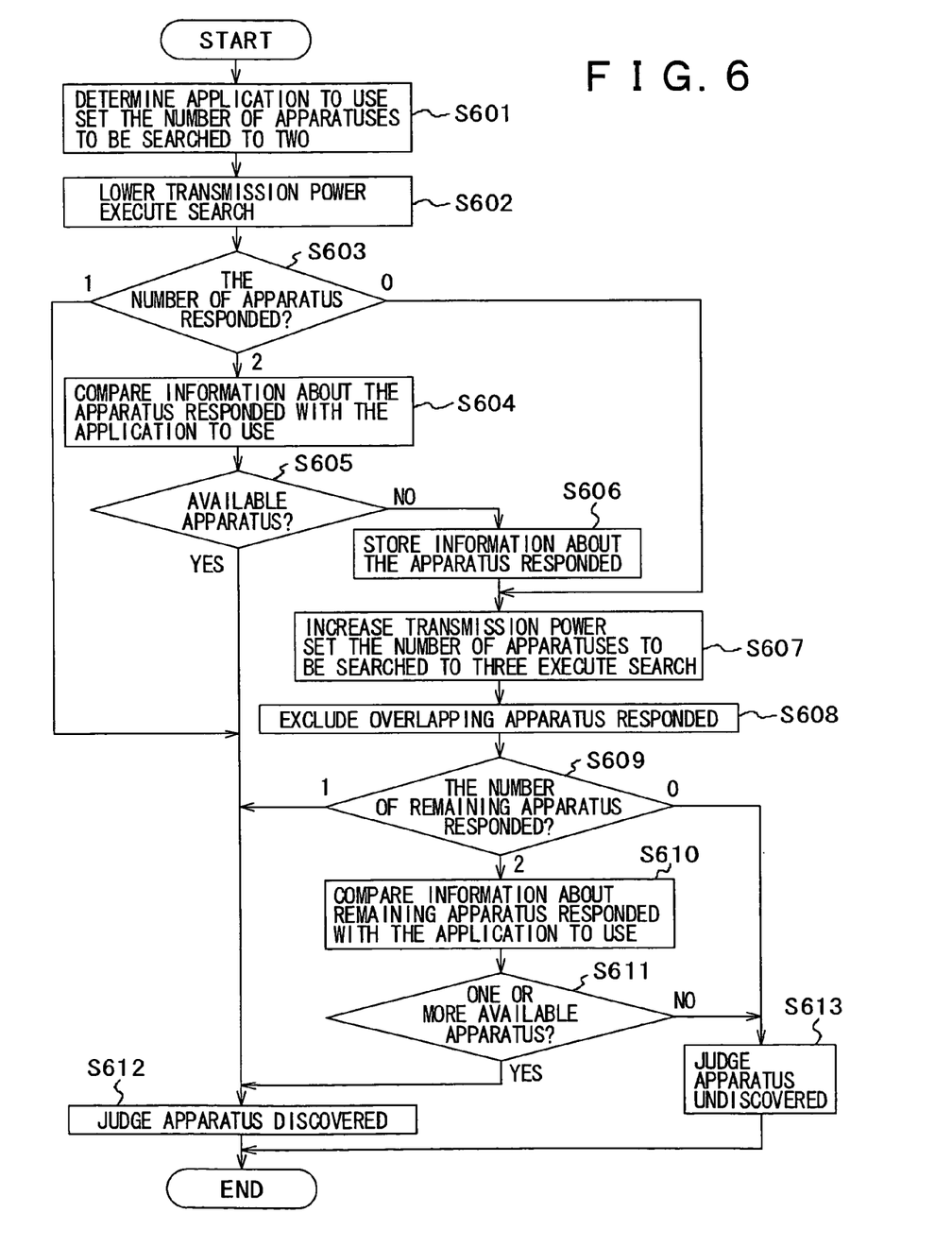
FIG. 6 is a flow chart describing a second control example during wireless connection.

FIG. 6 is a flow chart describing the second example of control the wireless communication.

In step S601, the application program for image transferring is activated to determine the information (here, the service class) of the application to use, and as well as the number of the apparatuses to be searched is set to two.

In step S602, the transmission power is decreased, and then, the Bluetooth module 18 is made transmit the interrogation message to search the apparatus.

In step S603, if one apparatus responded to the interrogation, the process proceeds to step S612. If two apparatuses responded, the process proceeds to step S604. Further, if no apparatus responded, the process proceeds to step S607.

In step S604, the information (here, the service class) of the application which can be handled by the apparatus responded is obtained and is compared with that of the preliminarily determined application to use.

In step S605, if a comparison result indicates that the apparatus that responded can deal with the target application, the process proceeds to step S612. If there is no available apparatus (that is, apparatus capable of handling the application), the process proceeds to step S606.

In step S606, the information (device addresses) regarding all apparatuses that responded is temporarily stored in the memory 13.

In step S607, the transmission power is increased from that at the first search, the number of the apparatuses to be searched is set to three, and then, the interrogation message is transmitted to execute the search.

In step S608, the device address of the apparatus that responded during the search is compared with the device address stored in step S606 to exclude the overlapping apparatuses.

In step S609, if one apparatus remains by excluding the overlapping apparatuses, the process proceeds to step S612. If two apparatuses remain, the process proceeds to step S610. Further, there is no remaining apparatus, the process proceeds to step S613.

In step S610, the information regarding the remaining two apparatuses is compared with the information of the predetermined application to use.

In step S611, if one or more apparatus capable of transferring images exist, the process proceeds to step S612. If no apparatus exists, the process proceeds to step S613.

In step S612, it is judged that the apparatus capable of transferring images is discovered. Here, if the apparatus is judged to be an available apparatus in steps S603 and S609 and there is one available apparatus in step S611, for example, the user is informed of the device name of this apparatus, and in response to the input operation by the user, or automatically a connection link is established. Further, if there are two available apparatuses in step S611, for example, the device names or the like of these apparatuses are displayed on the monitor 15, and then, the connection link is established to the apparatus selected by the user's operation.

In step S613, it is judged that no available corresponding apparatus is discovered, and then, for example, the user is informed of this with the indication on the monitor 15.

In the above-mentioned process, if only one slave apparatus responded at the first search, this apparatus is judged to be the available apparatus. If the number of the apparatuses to be searched is plural, and only one apparatus responded, the apparatus has a higher possibility that it is a target apparatus, so that the connection to the target apparatus can be provided in a short interval. At the second search, the number of apparatuses is also plural, and the number of the apparatuses to be searched is also two after excluding the overlapping apparatuses. Thus, if the number of the remaining apparatus is one, the apparatus judged to be available is highly possibly the target apparatus.

Further, in a case where a plurality of apparatuses responded, the filtering based on the service class increases the possibility of discovery of the target apparatus. Here, in the above-described process, there is a possibility that a plurality of apparatuses having the matched service class are discovered and this is informed of the user. Further, there is also a possibility that a non-target apparatus having the same service class is discovered. However, such a possibility may be avoided by, at the first search in which the searchable area is limited, making the number of the apparatuses to be searched as few as possible (that is, two) and making the number of the apparatuses not so large at the second search. Thus, the possibility that the user's selection operation is required or the connection is made to a non-target apparatus, is made extremely low, so that the stress in the user's operation can be reduced.

A THIRD CONTROL EXAMPLE

Figure 7:
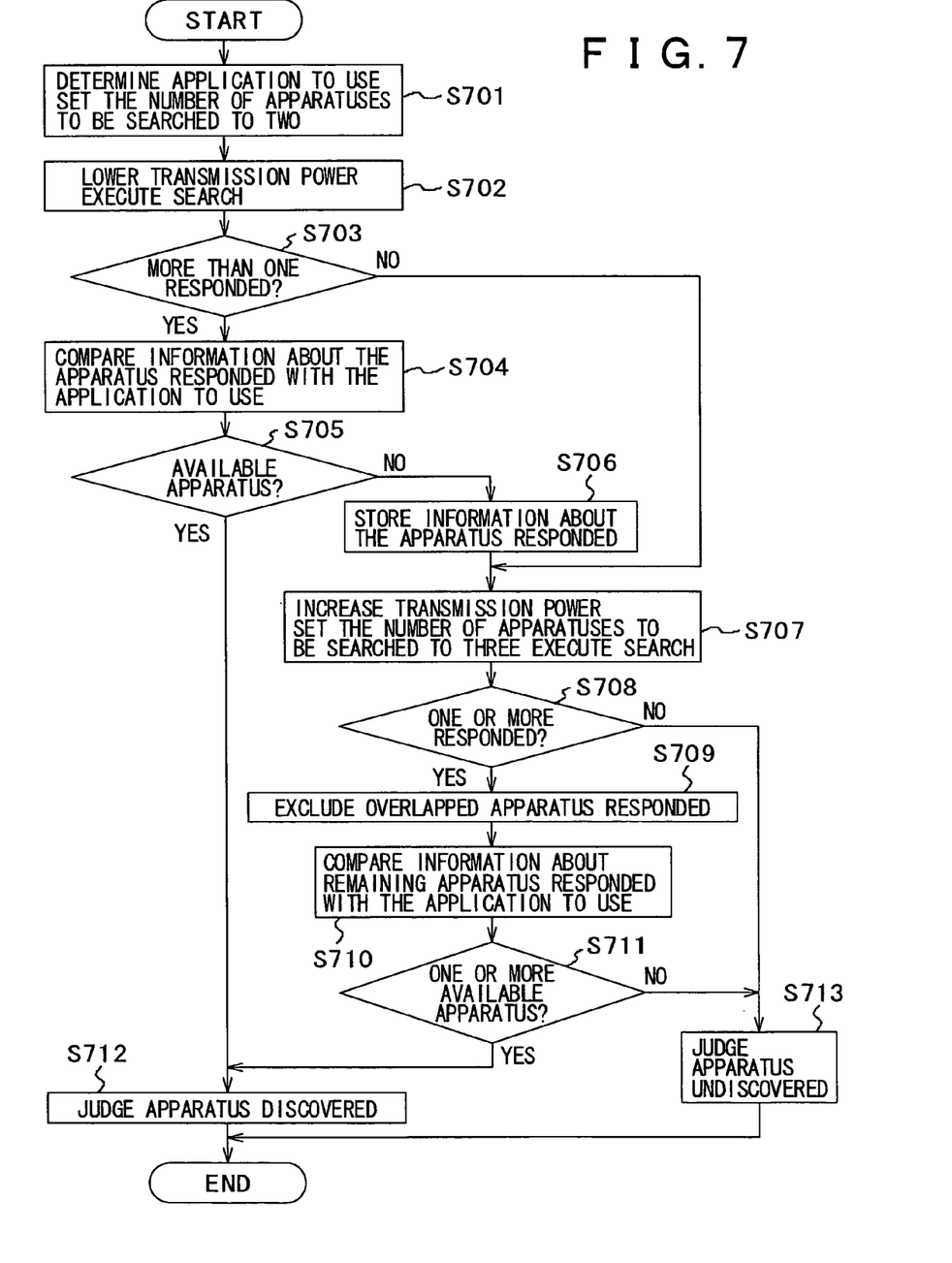
FIG. 7 is a flow chart describing a third control example during wireless connection.

FIG. 7 is a flow chart illustrating a third control example during wireless connection.

In the flow chart of FIG. 7, the difference from that in FIG. 6 is in that if one or more responses are received in the judgment in step S703, the comparison based on the application to use in step S704 is always carried out, and then, the available apparatus is judged. Further, also in the second search, in a case of receiving one or more responses in step S708, the comparison based on the application to use is always carried out for the remaining apparatus after excluding the overlapping apparatuses in step S709. That is, in the third control example, the filtering carried out for all apparatus responded increases the possibility of discovery of the target apparatus. Further, like the second example of control, limiting the number of the apparatuses to be searched prevents the user from being disturbed upon selection of the connection target because of a lot of apparatuses responded.

Further, in the above-described example, the service class is used for filtering the apparatuses responded. However, in addition, for example, the device class or the device name can be used for filtering. Further, mixed use of these information pieces can increase the possibility of discovery of the target slave apparatus.

Furthermore, the above embodiments were described with the cases where the present invention is applied to the DSC wirelessly communicating with the printer apparatus. However, the present invention is also applicable to other apparatuses. For example, the present invention is applicable to another imaging apparatus such as a digital video camera, a portable telephone apparatuses, a PDA, a remote control apparatus, stationary video replay apparatus and video recording and replay apparatus, a PC, a printer apparatus and the like. Here, it is desirable that at least either of the master apparatus or the slave apparatus to be the connection target, to which the present invention is applied, is a small-sized portable apparatus. This lowers the transmission power upon the transmission of the interrogation by the master apparatus, which causes one apparatus to be close to the other apparatus to provide wireless communication. This provides a natural operation feeling to the user.

For example, the present invention is applicable to a case where an imaging apparatus is wirelessly connected as a master apparatus to a portable telephone apparatus to be used as an access point to a wide network such as the Internet, and data transmission and reception is carried out to the wide area network from the imaging apparatus.

The present invention is also applicable to a case where a portable telephone apparatus, or a special remote control apparatus, as a master apparatus is wirelessly connected to an apparatus such as a video apparatus or an imaging apparatus to remotely control the slave apparatus. The present invention is further applicable to a case where a wireless communication mouse, a portable external storing apparatus or the like is recognized by making them closer to the PC as a master apparatus to provide the wireless connection, so as to carry out input operation to the PC through the mouse or to exchange stored data between the PC and the external storing apparatus.

In the electronic apparatus according to the present invention, when the desired apparatus is discovered at the first interrogation, the judgment as to whether connection made by comparing the attribution information increases the possibility of accurate connection to a desired apparatus in a short time period. Further, if a not-target apparatus is discovered at the first interrogation, and if there is no apparatus responded, re-searching is executed again, in which the condition is made better for searching the desired apparatus by increasing the number of apparatuses to be searched, so that the search for the desired apparatus is continued without user's operation. Therefore, the connection to the desired apparatus is provided more surely in a short time period with improved user's operation feeling.

Further, at the first transmission of the interrogation signal, the transmission power control means for lowering the transmission power than that after the establishment of the connection link is provided, so that, for example, upon the transmission of the first interrogation can increase the possibility of discovery of the desired apparatus.

Furthermore, for example, the identification information storing means for storing the identification information for identifying the apparatus that responded to the interrogation signal is provided. In a case where the attribution information regarding the apparatus responded to the first interrogation signal disagrees with the attribution information stored in the attribution information storing means, the identification information is stored in the identification information storing means, and then the retransmission of the interrogation signal is executed. Only in a case where the identification information regarding the apparatus responded after the retransmission disagrees with the information stored in the identification information storing means, the attribution information regarding the apparatus responded is compared with the information stored in the attribution information storing means, and if the former information agrees with the latter, the communication control means is structured to establish the connection link to the target apparatus so that the non-target apparatus is searched by the second interrogation. Thus, the user is not forced to useless selection operation from the searched apparatuses, so that the operation feeling is further improved.

Further, in the communication control method according to the present invention, if the desired apparatus is discovered by the first interrogation, it is judged whether the connection is made, by comparing the attribution information. This increases the possibility of the accurate connection to the desired apparatus in a short time period. In addition, at the first interrogation, in a case where a non-target apparatus is found, or in a case where there is no responding apparatus, the number of the apparatuses to be searched is increased to make the condition better for searching the desired apparatus to execute interrogation again, so that the search for the desired apparatus is continued without user's operation. Therefore, the connection to the desired apparatus is provided more surely in a short time period with improved user's operation feeling.

Further, for example, upon the transmission of the transmission of the first interrogation signal, the transmission power is lowered than that after the establishment of the connection link is provided, so that the possibility of discovery of the desired apparatus can be increased than that at the first interrogation.

Furthermore, for example, in a case where the attribution information regarding the apparatus that responded to the first interrogation signal disagrees with the attribution information previously stored in the attribution information storing means, the identification information regarding the apparatus responded is stored in a memory and retransmission of the interrogation signal is executed. Only in a case where the identification information regarding the apparatus responded after the retransmission disagrees with the identification information stored in the memory, the attribution information regarding the apparatus responded is compared with the attribution information previously stored. If the former information agrees with the latter previously stored, a connection link to the target apparatus is established. Thus, the user is not forced to useless selection operation from the searched apparatuses, so that the operation feeling is further improved.

What is claimed is:

1. An electronic apparatus for searching a connection target apparatus through a wireless communication line and providing a wireless connection to a searched apparatus to transmit and receive a signal, said electronic apparatus comprising:
    wireless communication means for transmitting and receiving the signal through said wireless communication line;
    communication control means for controlling a communication procedure performed by said wireless communication means; and
    attribution information storing means for previously storing first attribution information regarding said connection target apparatus, wherein:
    said communication control means:
    determines the number of apparatuses to be searched,
    performs a first transmission of an interrogation signal for search,
    obtains second attribution information regarding an apparatus responded to said interrogation signal from received information from the apparatus responded,
    compares the second attribution information with the first attribution information stored in said attribution information storing means, and
    in a case of agreement, establishes a connection link to the apparatus responded, and in a case of disagreement and in a case where no apparatus responded, increases the number of the apparatus to be searched for retransmission of said interrogation signal.

2. The electronic apparatus according to claim 1, wherein: the number of the apparatuses to be searched is set to one at the first transmission of said interrogation signal, and the number of the apparatuses to be searched is set to two or more at the retransmission of said interrogation signal.

3. The electronic apparatus according to claim 1, further comprising transmission power control means for setting a transmission power lower than that after establishment of said connection link at the first transmission of said interrogation signal.

4. The electronic apparatus according to claim 3, wherein said transmission power control means sets the transmission power higher than the first transmission of said interrogation signal at the retransmission of said interrogation signal.

5. The electronic apparatus according to claim 1, further comprising identification information storing means for storing first identification information for identifying the apparatus responded to the first transmission of said interrogation signal, wherein:
    said communication control means:
    in a case where said second attribution information regarding the apparatus responded to the first transmission of said interrogation signal disagrees with said first attribution information stored in said attribution information storing means, stores the first identification information regarding the apparatus responded to the first transmission of said interrogation signal in said identification information storing means and executes the retransmission of said interrogation signal,
    only in a case where second identification information regarding an apparatus responded after the retransmission disagrees with the first identification information stored in said identification information storing means, compares third attribution information of the apparatus responded after the retransmission with the first attribution information stored in said attribution information storing means, and
    in a case where the third attribution information regarding the apparatus responded after the retransmission agrees with the first attribution information stored in said attribution information storing means, establishes a connection link to the apparatus responded after the retransmission.

6. The electronic apparatus according to claim 1, wherein said first to third attribution information include information indicative of a type of available application.

7. The electronic apparatus according to claim 1, wherein:
    the number of the apparatuses to be searched is set to two at the first transmission of said interrogation signal, and
    the number of the apparatuses to be searched is set to three or more at the retransmission of said interrogation signal.

8. The electronic apparatus according to claim 1, wherein:
    said communication control means determines the number of the apparatus to be searched to transmit the interrogation signal for search, and
    in a case where only one apparatus responded to said interrogation signal, establishes a connection link to the apparatus,
    in a case where two or more apparatus responded to said interrogation signal, obtains attribution information regarding each of the apparatuses responded from the received information to compare the obtained attribution information with said first attribution information stored in said attribution information storing means and to establish a connection link to an apparatus whose attribution information agrees with the first attribution information, and
    in a case where no apparatus has attribution information agreeing with the first attribution information and in a case where no apparatus responded to said interrogation signal, increases the number of the apparatuses to be searched to perform retransmission of said interrogation signal.

9. The electronic apparatus according to claim 1, wherein in the retransmission of said interrogation signal the communication control means excludes attribution information regarding the apparatus which responded to said interrogation signal in said first transmission of an interrogation signal.

10. A communication control method for searching a connection target apparatus through a wireless communication line and providing a wireless connection to a searched apparatus to transmit and receive a signal, said method comprising the steps of:

storing first attribution information regarding said connection target apparatus previously;

determining the number of apparatuses to be searched and performs a first transmission of an interrogation signal for search on said wireless communication line; and obtaining second attribution information regarding an apparatus responded to said interrogation signal from received information the apparatus responded and comparing the second attribution information with the first attribution information previously stored, and in a case of agreement, establishing a connection link to the apparatus responded, and in a case of disagreement and a case of no apparatus responded, increasing the number of the apparatuses to be searched and retransmitting said interrogation signal.

11. The communication control method according to claim 10, wherein:

the number of the apparatuses to be searched is set to one at the first transmission of said interrogation signal, and the number of the apparatuses to be searched is set to two or more at the retransmission of said interrogation signal.

12. The communication control method according to claim 10, wherein a transmission power is set lower than that after establishment of said connection link at the first transmission of said interrogation signal.

13. The communication control method according to claim 10, wherein a transmission power is set higher than the first transmission of said interrogation signal at the retransmission of said interrogation signal.

14. The communication control method according to claim 10, wherein:

in a case where said second attribution information regarding the apparatus responded to the first transmission of said interrogation signal disagrees with said first attribution information previously stored, first identification information regarding the apparatus responded to the first transmission of said interrogation signal is stored in a memory and retransmission of said interrogation signal is performed, only in a case where second identification information regarding an apparatus responded after the retransmission disagrees with the first identification information stored in the memory, third attribution information regarding the apparatus responded after the retransmission is compared with the first attribution information stored previously, and in a case where the third attribution information regarding the apparatus responded after the retransmission agrees with the first attribution information stored previously, a connection link to the apparatus responded after the retransmission is established.

15. The communication control method according to claim 10, wherein:

the number of the apparatuses to be searched is set to two at the first transmission of said interrogation signal, and the number of the apparatuses to be searched is set to three or more at the retransmission of said interrogation signal.

16. The communication control method according to claim 10, wherein:

in a case where only one apparatus responded to said interrogation signal, a connection link to the apparatus is established, in a case where two or more apparatuses responded to said interrogation signal, attribution information regarding each of the apparatuses responded is obtained from the received information to compare the information with the first attribution information previously stored and to establish a connection link to an apparatus whose attribution information agrees with the first attribution information, and in a case where no apparatus has attribution information agreeing with the first attribution information and a case where no apparatus responded to said interrogation signal, the number of the apparatuses to be searched in increased to perform retransmission of said interrogation signal.

17. The communication control method according to claim 10, wherein in the retransmission of said interrogation signal, attribution information regarding the apparatus which responded to said interrogation signal in said first transmission of an interrogation signal is excluded.

* * * * *

UNITED STATES PATENT AND TRADEMARK OFFICE
CERTIFICATE OF CORRECTION

| | | |
|---|---|---|
| PATENT NO. | : 7,333,772 B2 | Page 1 of 1 |
| APPLICATION NO. | : 10/917375 | |
| DATED | : February 19, 2008 | |
| INVENTOR(S) | : Masanao Tsutsui | |

It is certified that error appears in the above-identified patent and that said Letters Patent is hereby corrected as shown below:

Column 1, line 63, please delete "salve" and insert --slave--;

Column 16, claim 8, line 2, please delete "apparatus" and insert --apparatuses--;

Column 16, claim 8, line 8, please delete "apparatus" and insert --apparatuses--.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,333,772 B2 | Page 1 of 1 |
| APPLICATION NO. | : 10/917375 | |
| DATED | : February 19, 2008 | |
| INVENTOR(S) | : Masanao Tsutsui | |

It is certified that error appears in the above-identified patent and that said Letters Patent is hereby corrected as shown below:

Column 1, line 63, please delete "salve" and insert --slave--;

Column 16, claim 8, line 26, please delete "apparatus" and insert --apparatuses--;

Column 16, claim 8, line 32, please delete "apparatus" and insert --apparatuses--.

This certificate supersedes the Certificate of Correction issued October 7, 2008.

Signed and Sealed this

Twenty-first Day of October, 2008

JON W. DUDAS
*Director of the United States Patent and Trademark Office*